Figure 6:
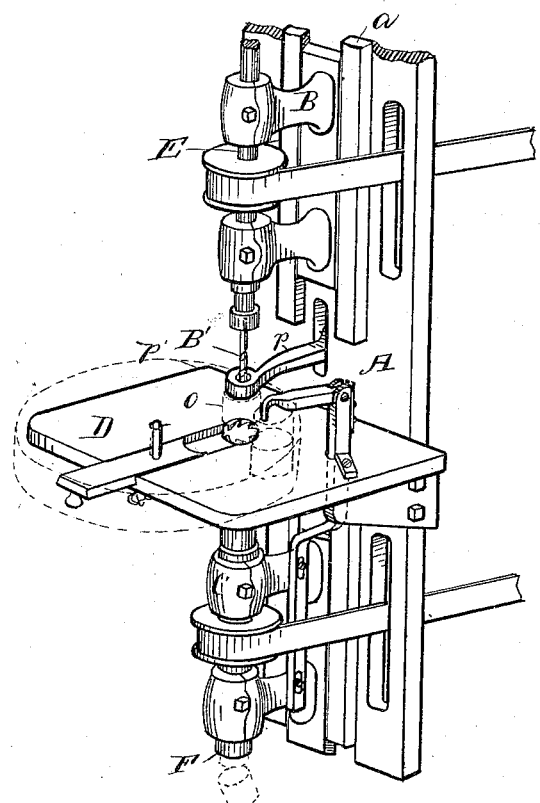

(No Model.) 2 Sheets—Sheet 1.
W. H. ALLEN.
MACHINE FOR CUTTING SPOOL BLANKS.
No. 344,931. Patented July 6, 1886.
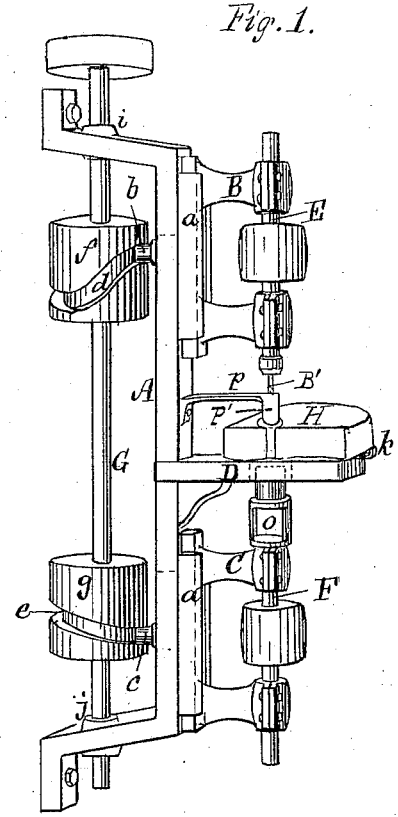
Fig. 1.
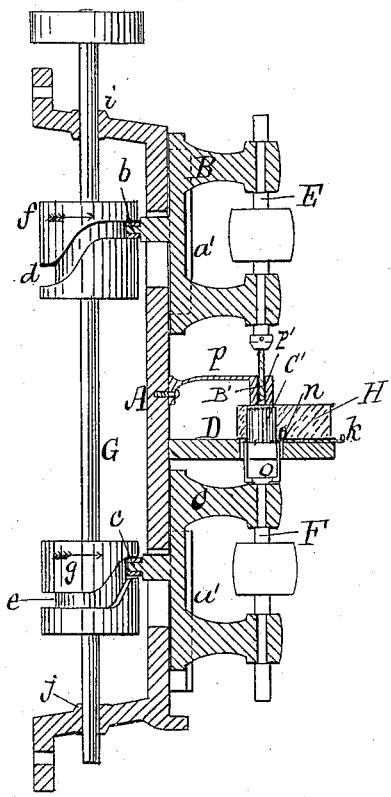
Fig. 2.
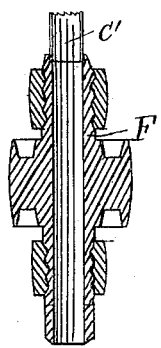
Fig. 3.
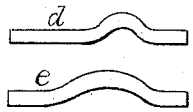
Fig. 4.
Fig. 5.
Witnesses
H. E. Lodge
M. D. Porter
Inventor
Wm. H. Allen.
F. Curtis, Atty.

(No Model.)  2 Sheets—Sheet 2.

W. H. ALLEN.
MACHINE FOR CUTTING SPOOL BLANKS.

No. 344,931.  Patented July 6, 1886.

Witnesses.
H. E. Lodge
A. F. Hayden.

Inventor.
William H. Allen.
F. Curtis. Atty.

United States Patent Office.

WILLIAM HAWKES ALLEN, OF CONWAY, NEW HAMPSHIRE.

MACHINE FOR CUTTING SPOOL-BLANKS.

SPECIFICATION forming part of Letters Patent No. 344,931, dated July 6, 1886.

Application filed March 13, 1883. Renewed March 13, 1886. Serial No. 195,151. (No model.)

*To all whom it may concern:*

Be it known that I, WILLIAM HAWKES ALLEN, a citizen of the United States, residing at Conway, in the county of Carroll and State of New Hampshire, have invented certain new and useful Improvements in Machines for Cutting Spool-Blanks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

I employ in this machine a revolving "tub" or cylindrical saw to cut the spool-blanks, and a revolving bit or auger, operating in axial alignment therewith, to drill the hole in such blank, a table to receive the block of wood from which the blanks are cut being located between the saw and bit. I also employ upon said table an adjustable pivot to enter a hole in the under side of the block of wood and constitute a point of rotation of such block, in order that the latter may be fed along in a circular path as the blanks are successively cut from it, the pivot being placed nearer the axis of rotation of the bit and saw after each complete revolution of the block, in order to present new stock to the action of said bit and saw. The bit and saw are each carried by arbors mounted independently in head-stocks or carriages supported upon and traversing suitable guides with a fixed table between them to support the wooden block, and the traverses of each carriage are effected by a rotary hub containing a cam-groove to receive a stud from the carriage, the two hubs being secured to a driving-shaft arranged alongside the guides upon which the carriages slide. The bit and saw pass through the wooden block from opposite sides, the first, as before stated, boring the hole in the axis of the spool-blank, while the saw cuts the blank from the block.

The drawings accompanying this specification represent in Figure 1 a side elevation, in Fig. 2 a vertical section, of a machine containing my invention. Fig. 3 represents a section of an arbor made hollow. Figs. 4 and 5 are views of the cam-grooves for driving the tool-carriers, as developed upon a plane. Fig. 6 represents a perspective view of my machine, taken from the side opposite to that from which Fig. 1 is taken.

In said drawings, A represents the frame of the machine, which in the present instance is an upright bracket, to be secured to the wall of the apartment (or may be an independent frame-work of wood or iron,) such standard containing upon its front face parallel vertical guides $a\ a$, which constitute slides for the traveling head-stocks or tool-carriages, which are shown at B and C as adapted to slide to and fro of such slides. The uppermost carriage, B, carries the bit B', for boring the hole in the spool-blank, the lowermost carriage, C, carrying the tub-saw C' for cutting the spool-blanks, while between these carriages the bracket A has affixed to its front face a table, D, to support the block of wood from which the blanks are cut. The bit and saw each are carried by an arbor, E or F, journaled in the carriages B C, respectively, such arbors being driven by bands and pulleys after the manner of turning-lathes. Each carriage B C has a stud, $b$ or $c$, projecting rearward from it, through slots in the standard A, and each stud $b$ or $c$ enters a peripheral cam-groove, $d$ or $e$, formed, respectively, in hubs $f\ g$, secured to a common vertical shaft, G, journaled in bearings $i\ j$ of the bracket A, such shaft being rotated by suitable means.

It is essential, in the operation of this machine, that the saw, in the act of passing through and out of the wooden block to cut a spool-blank, shall remain out of the said block a certain period of time, to permit it to change its position and present a new surface to the action of the saw; and I prefer that the bit shall descend, bore the hole in the wood, and return with a rapid motion, and that its ascent shall be completed before the saw begins its ascent and enters the wood. I have therefore laid out the cam-groove $d$ in the hub $f$ with one-fourth of its length constituting the active portion to lower and return the bit, while the remainder is passive and permits the bit to remain stationary at its highest point, while one half the groove $e$ of the hub $g$ is active to raise and lower the saw, and the other half passive and allows the saw to remain idle at its lowest point. This precise proportional construction of the cam-grooves is not, however, arbitrary; but it should be approximately that.

In the manufacture of spool-blanks by this machine the blocks H H, &c., of wood of uniform thickness, are sawed from the end of the log, the thickness of the blocks being slightly greater than the length of the finished spool, in order to permit of the finishing of the ends of the latter at a subsequent operation in a different machine. The blocks of wood cut from the log, as stated, are practically round, and I bore in the center of each a small hole, which constitutes a point of rotation for the block when in the machine. I add to the top of the table D a plate, $k$, which is contained in a channel, $l$, in each table, and confined, if desired, by a clamp-screw which passes through a slot in such plate and screws into the table, and I erect upon the free end of this plate $k$ a short stud, $n$, adapted to enter the hole in the center of each block of wood. This slide is drawn out by hand as the blanks are successively cut from the block of wood, so as to expose the uncut parts thereof to the action of the the tools until the row of holes left by their operation extend across the block. The block is then shifted a short distance laterally and another row cut in the same manner.

The lower portion of the saw $C'$ may be formed with one or more lateral openings, $o$, as shown in Fig. 1 of the drawings, to permit of escape of the spool-blanks as they are cut in succession by the saw; or the arbor F may be tubular to communicate with the interior of the saw, as shown in Fig. 3 of the drawings.

To determine the correct position of the wooden block H as it is advanced after each descent of the saw, a spur or hinged rod may be secured to the upper end of the carriage C, to enter the hole in said block last cut by the saw.

To prevent rising of the block H while the saw is in operation, an arm, $p$, may be employed, and secured at its base to the bracket A, with its free end resting immediately over the block, and slotted to permit of passage of the bit $B'$, and it would be well to add to the under side of the arm $p$ a tubular foot, $p'$, to bear upon the block H, in order that the saw in its ascent may surround such foot and not come in contact with the arm proper.

The operation of my machine is as follows: It being understood that the carriages B and C are at their extremes of position apart and with their studs $b$ of the bit-carriage B about entering the active portion of the groove $d$, while the stud $c$ of the saw-carriage C is still in the passive portion of the groove $e$, but ready to soon enter the active portion thereof, the shaft G and arbors E F being in rotation, and a block of wood having been placed upon the table D, with the hole in its center inclosing the stud $n$ of the adjustable plate $k$, the bit, by the action of the active portion of the groove $d$ upon the stud $b$, descends into the block H and bores a hole, which becomes the axial hole in the center of the finished spool, then returns to its highest and inactive position, where it remains during the following three-quarters of a revolution of the hub $f$. As the bit $B'$ emerges from the block H, or slightly before it emerges therefrom, the active portion of the groove $e$ acts upon the stud $b$ to raise the carriage C, and the saw $C'$ rises through the wooden block and cuts from the latter a cylinder, which constitutes the spool-blank, the periphery of this cylinder being of course concentric with the bore in the blank for the reason that the bit and screw are in axial alignment. The saw now descends until the stud $b$ enters the passive portions of the groove $e$, when the saw remains at rest sufficiently long to permit the operator to rotate the block H upon the stud $n$ sufficiently to present a new surface of wood to the action of the bit and saw. This operation is continued until the entire circuit of the block H has been traversed by the bit and saw, when the operator stops the machine, or the cam-shaft G loosens the screw $l$ and advances the stud $n$ toward the axis of rotation of the bit and saw a distance sufficient to present a new surface of wood to the action of such tools. This traverse of the block by the bit and saw, and the feeding up of the block is continued until the block is exhausted, when the small central portion remaining of such block is removed and a new block substituted.

I claim—

1. In apparatus for forming spool-blanks, the combination, with a bit, $B'$, and saws $C'$, mounted in their carriages, provided with the studs $b$ $c$, of the shaft G and the hubs $f$ $g$ affixed thereto, provided with cam-grooves $d$ $e$, the said grooves differing in pitch, whereby the bit is caused to bore the hole and retreat rapidly by means of the groove $d$, before the saw, actuated more slowly by the groove $e$, enters the wood to cut out the spool-blank, substantially for purposes herein described.

2. The saw $C'$, which is adapted to cut a cylindrical blank, in combination with the bit $B'$, which is arranged opposite to said saw and adapted to bore the central hole in said blank, the arbors E F, which are respectively provided with said bit and said saw, the movable carriages B C, which respectively carry said arbors, and means for automatically moving said carriages toward and from each other, substantially as set forth.

3. In a machine for cutting spool-blanks, the adjustable plate $k$, sliding in a groove in the table, and provided on its upper face with stud $n$, for holding the blank and determining its position on the table, substantially as described.

In testimony whereof I affix my signature in presence of two witnesses.

WILLIAM HAWKES ALLEN.

Witnesses:
F. CURTIS,
H. E. LODGE.